United States Patent [19]
Lieder et al.

[11] Patent Number: 5,408,871
[45] Date of Patent: Apr. 25, 1995

[54] IDLE AIR CONTROL SYSTEM DIAGNOSTIC

[75] Inventors: Franz A. Lieder, White Lake; Gregory E. Labus, Flint; Gary A. Nichols, Farmington Hill; Stephen D. Matteson, Byron; Myron H. Bell, Highland, all of Mich.

[73] Assignee: General Motors Corporation, Detroit, Mich.

[21] Appl. No.: 187,937

[22] Filed: Jan. 27, 1994

[51] Int. Cl.⁶ ........................................... G01M 19/00
[52] U.S. Cl. .................................. 73/118.1; 73/118.2; 123/339
[58] Field of Search ................. 73/118.1, 117.3, 118.2; 364/431.01; 123/585, 339

[56] References Cited

U.S. PATENT DOCUMENTS

| | | | |
|---|---|---|---|
| 4,742,807 | 5/1988 | Sakamoto et al. | 123/339 |
| 4,794,790 | 1/1989 | Margarit-Metaxa et al. | 73/118.1 |
| 4,875,456 | 10/1989 | Tomisawa | 123/585 |
| 4,903,526 | 2/1990 | Miyama et al. | 73/117.3 |
| 4,955,341 | 9/1990 | Trombley et al. | 123/339 |
| 4,989,564 | 2/1991 | Cook et al. | 123/339 |
| 5,018,383 | 5/1991 | Togai et al. | 73/118.1 |
| 5,036,812 | 8/1991 | Fukui et al. | 123/339 |
| 5,065,718 | 11/1991 | Suzuki et al. | 123/339 |
| 5,113,347 | 5/1992 | Ohuchi et al. | 364/431.01 |
| 5,124,919 | 6/1992 | Kastelle | 73/118.1 |
| 5,138,874 | 8/1992 | Davis | 73/118.1 |
| 5,269,272 | 12/1993 | Nakaniwa | 123/339 |

Primary Examiner—Richard E. Chilcot, Jr.
Attorney, Agent, or Firm—Timothy G. Gorbatoff

[57] ABSTRACT

An idle air control system diagnostic for an internal combustion engine which utilizes RPM, engine timing and intake airflow measurements to detect the presence of idle RPM faults and eliminate or verify the idle air control system as the fault source. Engine idle RPM is measured and compared with a commanded idle RPM, and if within a predetermined range, an idle RPM fault exists and one of two additional tests (non-intrusive and intrusive) is conducted to determine whether the idle air control system is the source of the fault. In the non-intrusive test, intake airflow is measured and compared to a predetermined intake airflow value, and if not within a predetermined range, the idle air control system is determined to be the fault source. In the intrusive test, variations in intake airflow (or intake manifold pressure) are measured in response to variations in the movement of the engine throttle-bypass airway pintle. If no intake airflow variations are detected, the idle air control system is determined to be the fault source.

12 Claims, 4 Drawing Sheets

FIG. 3

| DIAGNOSTIC RESULT | IDLE RPM TEST | ENGINE SPARK TIMING TEST | INTAKE AIRFLOW RESPONSE |
|---|---|---|---|
| NO IDLE RPM FAULT | WITHIN RPM RANGE | WITHIN SPARK THRESHOLD | NOT APPLICABLE |
| IAC SYSTEM PASS (HIGH IDLE RPM FAULT) | WITHIN RPM RANGE | SPARK GREATLY RETARDED | FLOW RESPONDED TO IAC MOTOR MOVE |
| | ABOVE RPM RANGE | NOT APPLICABLE | |
| IAC SYSTEM FAIL (HIGH IDLE RPM FAULT) | WITHIN RPM RANGE | SPARK GREATLY RETARDED | FLOW DID NOT RESPOND TO IAC MOTOR MOVE |
| | ABOVE RPM RANGE | NOT APPLICABLE | |
| IAC SYSTEM PASS (LOW IDLE RPM FAULT) | WITHIN RPM RANGE | SPARK GREATLY ADVANCED | FLOW RESPONDED TO IAC MOTOR MOVE |
| | BELOW RPM RANGE | NOT APPLICABLE | |
| IAC SYSTEM FAIL (LOW IDLE RPM FAULT) | WITHIN RPM RANGE | SPARK GREATLY ADVANCED | FLOW DID NOT RESPOND TO IAC MOTOR MOVE |
| | BELOW RPM RANGE | NOT APPLICABLE | |

IDLE AIR CONTROL SYSTEM DIAGNOSTIC

This invention relates to an idle air control system diagnostic for an internal combustion engine, and more specifically, to an idle air control system diagnostic having idle RPM fault detection and source location characteristics using RPM, engine spark timing and intake airflow (or intake manifold pressure) measurements.

BACKGROUND OF THE INVENTION

Proper operation of an internal combustion engine requires varying air-fuel ratios to suit different operating conditions. Air enters the engine through a throttle body assembly mounted on the engine intake manifold. The air is subsequently mixed with fuel for use by individual cylinders in the combustion process.

The amount of air supplied to the engine during non-idle operation is controlled by a throttle plate located within the main air horn of the throttle body assembly. The throttle plate is mechanically interlocked to the vehicle accelerator pedal and is controlled by the amount of force exerted by the operator against the accelerator pedal.

During idle operation, no force is exerted against the accelerator pedal by the operator and the throttle plate is maintained in its normal, fully closed (or slightly open) position, restricting nearly all airflow around the throttle plate and through the air horn. The fuel requirements of the engine are drastically reduced. The minimum intake airflow required to maintain a stable idle RPM makes exacting control by a large throttle plate in the air horn extremely difficult. Therefore, the throttle body assembly is provided with an alternative (throttle-bypass) airway, bypassing the throttle plate and much smaller in size than the air horn. The throttle-bypass airway is equipped with an Idle Air Control (IAC) valve which provides for greater control over the amount of air flowing into the engine.

The IAC valve is controlled by a computer program (IAC control algorithm) contained within the vehicle on-board Electronic Control Module (ECM). Actuation of the IAC valve by the IAC control algorithm causes a pintle, protruding into the throttle-bypass airway, to move either further into or out of the airway. The position of the pintle in the throttle-bypass airway determines the amount of air permitted to pass through the airway and is varied as required to maintain a stable idle RPM.

An idle RPM fault condition occurs if the actual operating idle RPM is significantly higher or lower than a calculated, desired (commanded) idle RPM which varies based upon such factors as engine coolant temperature, vehicle speed and oxygen content in exhaust gases.

Detecting the existence of an idle RPM fault is essential to serviceability of the engine and ensuring proper operation of emission-related systems, in particular, the IAC System (including the IAC control algorithm, IAC valve, throttle-bypass airway and throttle plate). Serviceability is substantially enhanced by eliminating or verifying the IAC System as the source of the idle RPM fault.

SUMMARY OF THE INVENTION

It is therefore the general object of this invention to provide a means for detecting the presence of idle RPM faults and eliminating or verifying the IAC System as its source. In carrying forward this object, engine idle RPM is measured and compared with a calculated, desired (commanded) idle RPM which varies based upon several engine parameters. If the measured idle RPM is not within a predetermined range about the commanded idle RPM for a predetermined period of time, an idle RPM fault exists and additional tests are conducted to eliminate or verify the IAC System as the source of the fault.

If the measured idle RPM is within the predetermined range about the commanded idle RPM, an idle RPM fault may still exist. Engine controls often provide for engine spark timing compensation, spark firing advanced or retarded, to compensate for a significantly low or high idle RPM, respectively. Therefore, if no idle RPM fault is initially sensed, engine (spark) timing compensation is compared with calculated, permitted thresholds. If the engine timing compensation is not within its permitted compensation threshold, an idle RPM fault exists and additional tests are conducted to eliminate or verify the IAC System as the source of the fault. For example, the spark advance required to increase a low idle RPM to within acceptable idle RPM limits may exceed the threshold permitted for spark advance compensation, thereby indicating an idle RPM fault.

In one form of the invention, a non-intrusive (passive) test is conducted to determine the source of the idle RPM fault. According to this test, intake airflow is measured and compared to a predetermined intake airflow value. If the measured intake airflow is not within a predetermined range about the predetermined intake airflow, the source of the idle RPM fault is determined to be located within the IAC System.

In another form of the invention, an intrusive (active) test is conducted to determine the source of the idle RPM fault. According to this test, the position of the pintle in the throttle-bypass airway is varied. Resultant variations in the intake airflow (or intake manifold pressure) are measured. If the intake airflow (or intake manifold pressure) does not vary in response to a varied pintle position, the source of the idle RPM fault is determined to be located within the IAC System.

If the source of the idle RPM fault is determined not to be within the IAC System, possible other source locations of the fault include, but are not limited to, engine accessory overloading, vacuum leaks, excessive engine friction and fuel delivery system malfunction.

BRIEF DESCRIPTION OF THE DRAWINGS

FIG. 3 summarizes the IAC System Diagnostic intrusive test results.

DETAILED DESCRIPTION OF THE DRAWINGS

Figure 1:
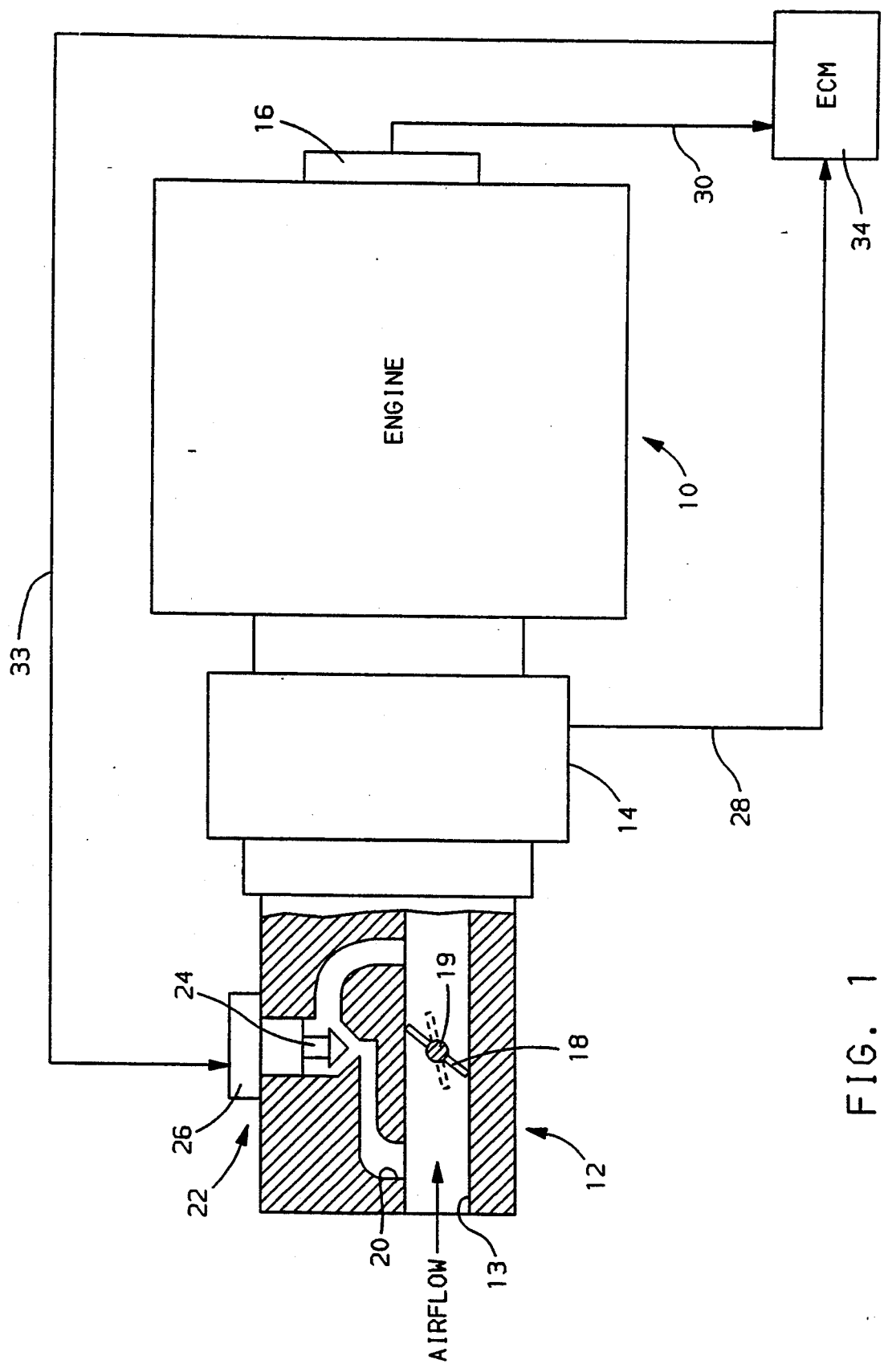
FIG. 1 is an overall schematic diagram of an IAC System.

Referring to FIG. 1, the reference numeral 10 generally designates an internal combustion engine having a throttle body 12 comprising an air horn 13 through which airflow enters the engine for mixture with fuel for combustion in the individual cylinders. A throttle plate 18, located in air horn 13, is mechanically coupled to and thereby controlled by the vehicle operator accelerator pedal (not shown). With the accelerator pedal depressed (i.e., force exerted on the pedal by the operator), throttle plate 18 rotably moves about a central axis 19 from its normal fully closed (or slightly open) position, represented by the solid line, to an open position, represented by the dashed line, to permit airflow around the throttle plate 18 and through the air horn 13. The degree of opening of the throttle plate 18 from its fully closed position varies with the amount of force exerted on the accelerator pedal.

When the force exerted on the accelerator pedal is removed, the throttle plate 18 rotably returns to its normal, fully closed position whereby the throttle plate 18 effectively blocks air from flowing around the throttle plate 18 and through the air horn 13 to the engine. A throttle-bypass airway 20 provides an alternative airway around throttle plate 18 to permit sufficient airflow for maintaining a stable idle RPM when the throttle plate 18 is in its fully closed position.

The amount of air which is permitted to pass through the throttle-bypass airway 20 is regulated by an Idle Air Control (IAC) valve 22 comprising a screw-driven pintle 24, which protrudes into the throttle-bypass airway 20, and an IAC stepper motor 26 which operates to turn the screw driving the pintle 24, moving the pintle 24 further into or out of the throttle-bypass airway 20, thereby decreasing or increasing, respectively, the amount of air permitted to flow through the throttle-bypass airway 20.

An IAC System Algorithm is contained in the vehicle on-board Electronic Control Module (ECM) 34 and controls the operation of the IAC valve pintle 24 by means of the IAC motor 26 over signal line 33 to permit the requisite amount of airflow to establish a desired idle RPM.

A signal representing the mass of air flowing through the throttle body 12 into the engine 10 is produced by a mass airflow meter 14, located in the engine air intake path, and transmitted to the ECM 34 via signal line 28. A signal representing the rotational speed (RPM) of the engine 10 is produced by a tachometer 16 sensing the RPM of the engine crankshaft (not shown) and transmitted to the ECM 34 via signal line 30.

The mass airflow and RPM signals are utilized by the IAC System Diagnostic Algorithm, contained within the ECM 34, to detect idle RPM faults and determine whether the source of the fault is located within the IAC System.

Typically, the IAC System Diagnostic will not be activated until basic test enabling criteria are met. The enabling criteria include, but are not limited to, existing fault conditions, coolant temperature, system voltage, ambient pressure and intake manifold air pressure.

Figure 2B:
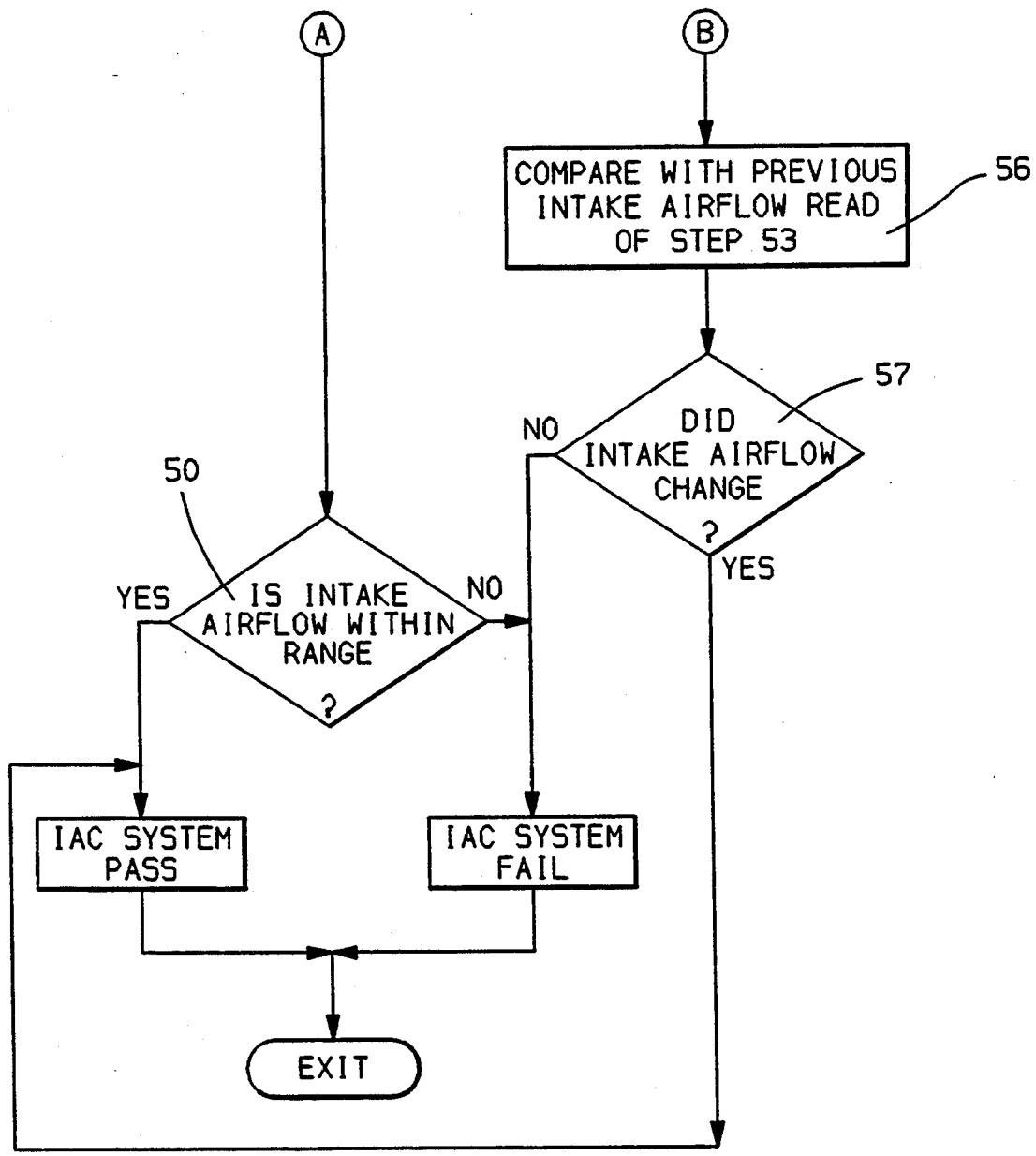
FIGS. 2A and 2B illustrate the operation of the IAC System Diagnostic Algorithm.
Figure 2A:
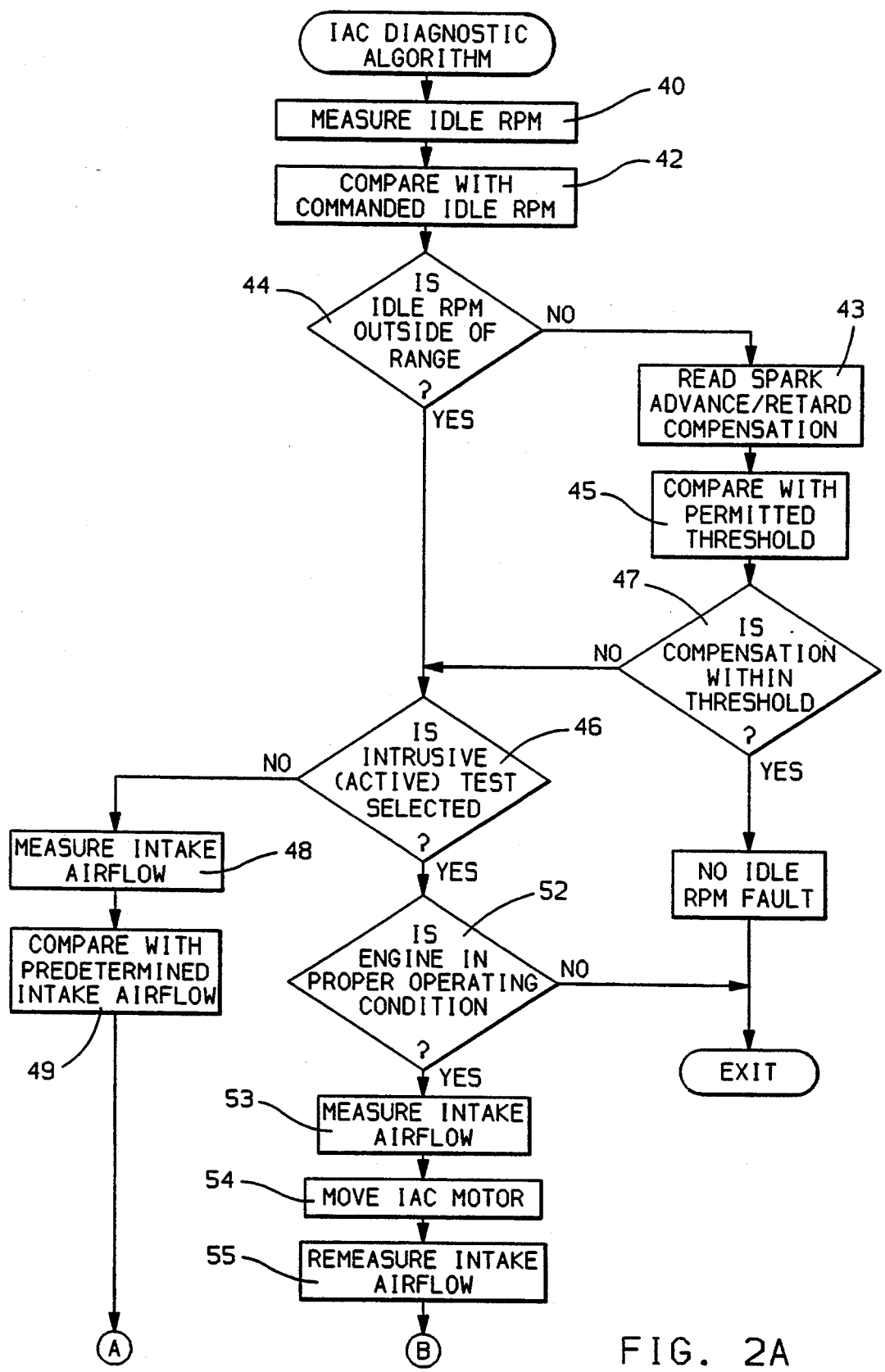

The operation of the IAC System Diagnostic Algorithm is illustrated in FIGS. 2A and 2B. The algorithm begins at step 40 where signals from the tachometer 16 are received via signal line 30 and measured to determine engine idle RPM. Reduction of signal noise may be achieved by filtering (averaging) the signals prior to measurement.

Step 42 looks to the IAC System Algorithm, also contained within the ECM 34, for a calculated, desired (commanded) idle RPM which varies based upon such engine parameters as coolant temperature, vehicle speed and oxygen content in exhaust gases, and compares it with the measured idle RPM of step 40.

If the measured idle RPM of step 40 is within a specified, predetermined range about the commanded idle RPM of step 42 for a predetermined period of time, the IAC System is deemed to be functioning within operational limits (step 44). An idle RPM fault may, however, still exist.

Engine controls contained in the ECM 34 often provide for engine spark timing compensation, i.e., spark firing advanced or retarded, to compensate for a significantly low or high idle RPM, respectively. Therefore, if no idle RPM fault is initially sensed, engine (spark) timing compensation is read in step 43 and compared in step 45 to permitted thresholds. If the engine timing compensation is not within the permitted thresholds (step 47), an idle RPM fault exists and additional tests are conducted to eliminate or verify the IAC System as the source of the fault. For example, the spark advance required to increase a low idle RPM to within acceptable idle RPM limits may exceed the threshold permitted for spark advance compensation. Conversely, the spark retard required to decrease a high idle RPM to within acceptable idle RPM limits may exceed the threshold permitted for spark retard compensation.

Alternative embodiments need not provide for spark advance/retard compensation detection; particularly, if the engine controls do not provide for spark advance/retard compensation in the presence of high or low idle RPM.

If the measured idle RPM of step 40 is not within the predetermined range about the commanded idle RPM of step 42 for a predetermined period of time, an idle RPM fault exists. Requiring the measured idle RPM to not be within the predetermined range for a predetermined period of time ensures that nuisance faults do not result from momentary RPM irregularities.

If an idle RPM fault is detected in step 44, one of two further tests (intrusive or non-intrusive) is performed to determine whether the source of the fault is located within the IAC System. If not located within the IAC System, the source of the idle RPM fault could be associated with many other engine factors, such as accessory drive overloading, vacuum leaks, excessive engine friction and fuel delivery system malfunction.

Decisional step 46 looks to see whether the intrusive (active) test has been selected. Selection of the active test is typically a decision made by a vehicle program calibrator based upon extensive testing of the vehicle in its design stage. If the program calibrator finds that the active test results in noticeable disruptions to the vehicle operation which may be a nuisance to the operator, the active test option will not be enabled. However, the active test must be selected if the vehicle utilizes "speed density" air-to-fuel ratio control in which intake airflow is not measured, but calculated.

If the active test is not enabled, the algorithm goes on to perform the passive test which begins with step 48. Therefore, although both the active and passive test appear in the IAC System Diagnostic Algorithm, only one will be operational for a particular vehicle.

In step 48, the engine intake airflow is measured over signal line 28. Step 49 looks to the IAC System Algorithm, also contained within the ECM 34, for a calibrated, predetermined intake airflow based upon commanded idle RPM and compares it with the measured intake airflow of step 48. If the measured intake airflow is within a predetermined range about the predetermined intake airflow, then the IAC System is deemed to be permitting the requisite intake airflow into the engine for proper RPM (step 50). The source of the idle RPM fault is therefore located externally to the IAC System. For example, if idle RPM of step 40 is too low, but the intake airflow of step 48 is sufficiently high to support a higher idle RPM, the source of the low idle RPM fault is not within the IAC System but may be the result of, for example, accessory drive overloading. Conversely, if the idle RPM of step 40 is too high, but the intake airflow of step 48 is sufficiently low to support only a lower idle RPM, the source of the fault is not within the IAC System but may be the result of, for example, a vacuum leak in the intake airflow pathway after the mass airflow meter 14.

If the measured intake airflow of step 48 is not within a predetermined range about the predetermined intake airflow of step 49 as determined by the IAC System Algorithm, the source of the idle RPM fault is deemed to be within the IAC System.

If the active test is selected in step 46, the algorithm continues onto step 52. The intrusive nature of this test requires that the engine be within certain operating conditions (e.g., steady cruise, mild acceleration or mild deceleration) to minimize vehicle operational disturbances resulting in driver nuisance. Therefore, step 52 ensures that these operating conditions exist before intrusive testing begins.

In step 53, the engine intake airflow is measured over signal line 28. Manifold absolute pressure is an available alternative parameter for use by the intrusive test. In step 54, the IAC motor 26 is actuated (moved) to control the position of the pintle 24 within the throttle-bypass airway 20. If the idle RPM of step 40 was too high, the pintle 24 is moved further into the throttle-bypass airway 20, increasing the airflow restriction into the engine 10 and thereby decreasing the intake airflow into the engine. If the idle RPM of step 40 was too low, the pintle 24 is moved further out of the throttle-bypass airway 20, decreasing the airflow restriction into the engine 10 and thereby increasing the intake airflow into the engine.

After movement of the IAC motor 26 in step 54, intake airflow is reread in step 55 and compared in step 56 with the intake airflow of step 53 to determine whether the intake airflow of step 53 responded to the movement of the IAC motor 26. If the intake airflow of step 53 responded to movement of the IAC motor 26 (i.e., the change in intake airflow exceeded a predetermined minimum threshold amount), the IAC System is determined to be functioning properly (step 57). Therefore, the source of the idle RPM fault is located external to the IAC System. The active test looks for actual intake airflow (or intake manifold pressure) response to IAC motor 26 movement to determine IAC System functioning. It is, therefore, more accurate than and preferred to the passive test which simply looks for a particular intake airflow based upon a commanded idle RPM.

Counters and timers may be incorporated into the algorithm whereby repeated failures must be sensed before parameters are determined to exceed thresholds/ranges or failed conditions are indicated.

FIG. 3 summarizes the results of the intrusive (active) test. If the measured idle RPM in step 40 is within a predetermined range about the commanded idle RPM of step 42 for a predetermined period of time (within RPM range), and the spark advance/retard compensation of step 43 is within its specified allowable threshold (within spark threshold), then no idle RPM fault exists and neither the active nor passive test need be performed. The diagnostic result is that no idle RPM fault exists—FIG.3, Line 60.

If the measured idle RPM of step 40 is within a predetermined range about the commanded idle RPM of step 42 for a predetermined period of time, but the engine timing compensation of step 43 provides for spark retard significantly greater than its permitted threshold; or, if the idle RPM of step 40 is higher than the upper limit of a predetermined range about the commanded idle RPM of step 42 for a predetermined period of time (high idle RPM fault), then, one of two diagnostic results is possible: (i) FIG. 3, Line 62—if the intake airflow of step 53 responds to the movement of the IAC motor 26 of step 54, the source of the high idle RPM fault lies outside the IAC System, e.g., vacuum leak; or, (ii) FIG. 3, Line 64—if the intake airflow of step 53 does not respond to the movement of the IAC motor 26 of step 54, the source of the high idle RPM fault lies within the IAC System itself, e.g., pintle 24 is stuck or the IAC motor 26 is not functional.

If the measured idle RPM of step 40 is within a predetermined range about the commanded idle RPM of step 42 for a predetermined period of time, but the engine timing compensation of step 43 provides for spark advance significantly greater than its permitted threshold; or, if the idle RPM of step 40 is lower than the lower limit of a predetermined range about the commanded idle RPM of step 42 for a predetermined period of time (low idle RPM fault), then, one of two diagnostic results is possible: (i) FIG. 3, Line 66—if the intake airflow of step 53 responds to the movement of the IAC motor 26 of step 54, the source of the low idle RPM fault lies outside the IAC system, e.g., accessory drive overloading; or, (ii) FIG. 3, Line 68—if the intake airflow of step 53 does not respond to the movement of the IAC motor 26 of step 54, the source of the low idle RPM fault lies within the IAC system itself, e.g., pintle 24 is stuck or IAC motor 26 is not functional.

The existence of an idle RPM fault condition is conveyed to the operator of the vehicle by means of a "Check Engine" indicator light. The more extensive diagnostic results detailed in FIG. 3 are made available to service personnel by means of a vehicle service "scan tool" to aid them in locating the source of the fault.

While this invention has been described in reference to the illustrated embodiment, it will be understood that various modifications will occur to those skilled in the art and systems/methods incorporating such modifications may fall within the scope of this invention, which is defined by the appended claims.

The embodiments of the invention in which an exclusive property or privilege is claimed are defined as follows:

1. A diagnostic system for an internal combustion engine idle air control system having an air control valve to control engine intake airflow to control engine speed to a commanded idle speed, the diagnostic system comprising:
   means for sensing idle speed;
   means for sensing intake airflow;
   means for detecting an idle speed fault when the sensed idle speed is not within a predetermined range about the commanded idle speed for a predetermined period of time; and
   means for indicating an idle air control system fault when the idle speed fault is detected and the sensed intake airflow is not within a predetermined range about a predetermined intake airflow.

2. The diagnostic system according to claim 1, wherein the idle air control system further having spark advance/retard compensation to compensate for the sensed idle speed different from the commanded idle speed, the diagnostic system further comprising a means for detecting an idle speed fault when the sensed idle speed is within the predetermined range about the commanded idle speed for the predetermined period of time and the spark advance/retard compensation is not within a predetermined threshold.

3. A diagnostic system for an internal combustion engine idle air control system having an air control valve and valve actuator for adjusting the air control valve to control engine intake airflow to control engine speed to a commanded idle speed, the diagnostic system comprising:

means for sensing idle speed;
means for sensing intake airflow;
means for detecting an idle speed fault when the sensed idle speed is not within a predetermined range about the commanded idle speed for a predetermined period of time;
means for controlling the valve actuator to move the air control valve when the idle speed fault is detected and predetermined engine operating conditions exist;
means for determining a change in the sensed intake airflow while the air control valve is moved; and
means for indicating an idle air control system fault when the determined change in the sensed intake airflow does not exceed a predetermined change in intake airflow.

4. The diagnostic system according to claim 3, wherein the idle air control system further having spark advance/retard compensation to compensate for the sensed idle speed different from the commanded idle speed, the diagnostic system further comprising a means for detecting an idle speed fault when the sensed idle speed is within the predetermined range about the commanded idle speed for the predetermined period of time and the spark advance/retard compensation is not within a predetermined threshold.

5. A diagnostic system for an internal combustion engine idle air control system having an air control valve and valve actuator for adjusting the air control valve to control engine intake manifold pressure to control engine speed to a commanded idle speed, the diagnostic system comprising:

means for sensing idle speed;
means for sensing intake manifold pressure;
means for detecting an idle speed fault when the sensed idle speed is not within a predetermined range about the commanded idle speed for a predetermined period of time;
means for controlling the valve actuator to move the air control valve when the idle speed fault is detected and predetermined engine operating conditions exist;
means for determining a change in the sensed intake manifold pressure while the air control valve is moved; and
means for indicating an idle air control system fault when the determined change in the sensed intake manifold pressure does not exceed a predetermined change in intake manifold pressure.

6. The diagnostic system according to claim 5, wherein the idle air control system further having spark advance/retard compensation to compensate for the sensed idle speed different from the commanded idle speed, the diagnostic system further comprising a means for detecting an idle speed fault when the sensed idle speed is within the predetermined range about the commanded idle speed for the predetermined period of time and the spark advance/retard compensation is not within a predetermined threshold.

7. A method of diagnosing an internal combustion engine idle air control system having an air control valve to control engine intake airflow to control engine speed to a commanded idle speed, the method comprising:

sensing idle speed;
sensing intake airflow;
detecting an idle speed fault when the sensed idle speed is not within a predetermined range about the commanded idle speed for a predetermined period of time; and
indicating an idle air control system fault when the idle speed fault is detected and the sensed intake airflow is not within a predetermined range about a predetermined intake airflow.

8. The method of diagnosing according to claim 7, wherein the idle air control system further having spark advance/retard compensation to compensate for the sensed idle speed different from the commanded idle speed, the method further comprising detecting an idle speed fault when the sensed idle speed is within the predetermined range about the commanded idle speed for the predetermined period of time and the spark advance/retard compensation is not within a predetermined threshold.

9. A method of diagnosing an internal combustion engine idle air control system having an air control valve and valve actuator for adjusting the air control valve to control engine intake airflow to control engine speed to a commanded idle speed, the method comprising:

sensing idle speed;
sensing intake airflow;
detecting an idle speed fault when the sensed idle speed is not within a predetermined range about the commanded idle speed for a predetermined period of time;
controlling the valve actuator to move the air control valve when the idle speed fault is detected and predetermined engine operating conditions exist;
determining a change in the sensed intake airflow while the air control valve is moved; and
indicating an idle air control system fault when the determined change in the sensed intake airflow does not exceed a predetermined change in intake airflow.

10. The method of diagnosing according to claim 9, wherein the idle air control system further having spark advance/retard compensation to compensate for the sensed idle speed different from the commanded idle speed, the method further comprising detecting an idle speed fault when the sensed idle speed is within the predetermined range about the commanded idle speed for the predetermined period of time and the spark advance/retard compensation is not within a predetermined threshold.

11. A method of diagnosing an internal combustion engine idle air control system having an air control valve and valve actuator for adjusting the air control valve to control engine intake manifold pressure to control engine speed to a commanded idle speed, the method comprising:

sensing idle speed;

sensing intake manifold pressure;

detecting an idle speed fault when the sensed idle speed is not within a predetermined range about the commanded idle speed for a predetermined period of time;

controlling the valve actuator to move the air control valve when the idle speed fault is detected and predetermined engine operating conditions exist;

determining a change in the sensed intake manifold pressure while the air control valve is moved; and indicating an idle air control system fault when the determined change in the sensed intake manifold pressure does not exceed a predetermined change in intake manifold pressure.

12. The method of diagnosing according to claim 11, wherein the idle air control system further having spark advance/retard compensation to compensate for the sensed idle speed different from the commanded idle speed, the method further comprising detecting an idle speed fault when the sensed idle speed is within the predetermined range about the commanded idle speed for the predetermined period of time and the spark advance/retard compensation is not within a predetermined threshold.

* * * * *